(12) United States Patent
Thomas et al.

(10) Patent No.: US 12,444,405 B2
(45) Date of Patent: Oct. 14, 2025

(54) TEXTUAL KNOWLEDGE TRANSFER FOR IMPROVED SPEECH RECOGNITION AND UNDERSTANDING

(71) Applicants: International Business Machines Corporation, Armonk, NY (US); Ohio State Innovation Foundation, Columbus, OH (US)

(72) Inventors: Samuel Thomas, White Plains, NY (US); Vishal Sunder, Columbus, OH (US); Hong-Kwang Kuo, Pleasantville, NY (US); Brian E. D. Kingsbury, Cortlandt Manor, NY (US); Eric Fosler-Lussier, Columbus, OH (US); George Andrei Saon, Stamford, CT (US)

(73) Assignees: International Business Machines Corporation, Armonk, NY (US); Ohio State Innovation Foundation, Columbus, OH (US)

( * ) Notice: Subject to any disclaimer, the term of this patent is extended or adjusted under 35 U.S.C. 154(b) by 364 days.

(21) Appl. No.: 18/310,598

(22) Filed: May 2, 2023

(65) Prior Publication Data

US 2024/0371361 A1    Nov. 7, 2024

(51) Int. Cl.
*G10L 15/06* (2013.01)
*G10L 15/16* (2006.01)

(52) U.S. Cl.
CPC ............ *G10L 15/063* (2013.01); *G10L 15/16* (2013.01)

(58) Field of Classification Search
CPC ........ G10L 15/063; G10L 15/16; G10L 15/00
See application file for complete search history.

(56) References Cited

U.S. PATENT DOCUMENTS 11,562,735 B1 * 1/2023 Gupta ................. G10L 15/1822
2021/0209139 A1 * 7/2021 Wu ........................ G06N 3/006
(Continued)

FOREIGN PATENT DOCUMENTS

CN         114242071 A      3/2022

OTHER PUBLICATIONS

Sunder, et al., "Fine-Grained Textual Knowledge Transfer to Improve RNN Transducers for Speech Recognition and Understanding," May 5, 2022.

(Continued)

*Primary Examiner* — Michael Colucci
(74) *Attorney, Agent, or Firm* — Amin, Turocy & Watson, LLP

(57) ABSTRACT

Systems, computer-implemented methods, and computer program products to facilitate fine-grained textual knowledge transfer to improve speech recognition and understanding are provided. According to an embodiment, a system can comprise a processor that executes components stored in memory. The computer executable components comprise deriving component that can derive one or more speech-based embeddings from an utterance via a speech encoder. The computer executable components can comprise a cross-attention component that can align, at a token level, one or more large language model (LLM) based sentence embeddings with the one or more speech-based embeddings. The computer executable components can comprise a loss component that can combine an alignment loss and an automatic speech recognition (ASR) loss.

20 Claims, 8 Drawing Sheets

(56) References Cited

U.S. PATENT DOCUMENTS

| | | |
|---|---|---|
| 2022/0230625 A1 | 7/2022 | Zhu et al. |
| 2022/0319494 A1 | 10/2022 | Thomas et al. |
| 2022/0382979 A1 | 12/2022 | Klein et al. |
| 2023/0169281 A1* | 6/2023 | Zheng ............... G10L 15/28 704/2 |
| 2023/0214718 A1* | 7/2023 | Hong ............... G06N 20/00 706/12 |
| 2023/0223018 A1* | 7/2023 | Xing ............... G10L 15/22 704/232 |
| 2023/0386450 A1* | 11/2023 | Eby ............... G10L 15/063 |
| 2024/0045925 A1* | 2/2024 | Savvides ............... G06N 3/084 |
| 2024/0135238 A1* | 4/2024 | Sattigeri ............... G06N 3/0455 |
| 2024/0256948 A1* | 8/2024 | Betthauser ............... G06N 20/00 |
| 2024/0274286 A1* | 8/2024 | Chen ............... G16H 50/70 |
| 2024/0311579 A1* | 9/2024 | Dong ............... G06F 40/284 |
| 2024/0331235 A1* | 10/2024 | Smock ............... G16C 20/70 |
| 2024/0354319 A1* | 10/2024 | Dinu ............... G06F 16/3329 |
| 2024/0362272 A1* | 10/2024 | Lee ............... G06F 40/40 |
| 2024/0386015 A1* | 11/2024 | Crabtree ............... G06F 16/9024 |

OTHER PUBLICATIONS

Lai, Cheng-I, et al., "Towards Semi-Supervised Semantics Understanding from Speech," arXiv preprint arXiv:2011.06195, arXiv:2011.06195v1 [cs.CL] Nov. 11, 2020.

Sunder, et al., "Tokenwise Contrastive Pretraining for Finer Speech-to-BERT Alignment in End-to-End Speech-to-Intent Systems," Jul. 1, 2022, arXiv:2204.05188v2 [cs.CL].

* cited by examiner

TEXTUAL KNOWLEDGE TRANSFER FOR IMPROVED SPEECH RECOGNITION AND UNDERSTANDING

The following disclosures are submitted under 35 U.S.C. 102(b)(1)(A):

DISCLOSURE: [Fine-Grained Textual Knowledge Transfer to Improve RNN Transducers for Speech Recognition and Understanding, Vishal Sunder, Samuel Thomas, Hong-Kwang J. Kuo, Brain Kingsbury, Eric Fosler-Lussier, May 5, 2022, 1-5].

DISCLOSURE: [Tokenwise Contrastive Pretraining for Finer Speech-to-BERT Alignment in End-to-End Speech-to-Intent Systems, Vishal Sunder, Samuel Thomas, Hong-Kwang J. Kuo, Brain Kingsbury, Eric Fosler-Lussier, Jul. 1, 2022, 1-5].

BACKGROUND

RNN Transducer technology is commonly used for building deployable models for end-to-end automatic speech recognition (ASR) and spoken language understanding (SLU). Such models operate on speech directly, so there remains a potential to improve performance by using text based models like BERT that have strong language capabilities. The subject disclosure relates to speech recognition and understanding, and more specifically, to fine-grained textual knowledge transfer for improved spoken language understanding.

SUMMARY

The following presents a summary to provide a basic understanding of one or more embodiments of the invention. This summary is not intended to identify key or critical elements, or delineate any scope of the particular embodiments or any scope of the claims. Its sole purpose is to present concepts in a simplified form as a prelude to the more detailed description that is presented later. In one or more embodiments described herein, systems, computer-implemented methods, and/or computer program products that facilitate end-to-end integration of dialogue history for spoken language understanding are provided.

According to an embodiment, a system can comprise a processor that executes computer executable components stored in memory. The computer executable components can comprise a deriving component that can derive one or more speech-based embeddings from an utterance via a speech encoder. Further, the computer executable components can comprise a cross-attention component that aligns, at a token level, one or more Large Language Model (LLM) embeddings with the one or more speech-based embeddings. The computer executable components can comprise a loss component that combines an alignment loss and an Automatic Speech Recognition (ASR) loss. Additionally, the computer executable components can comprise a training component that trains an ASR system with an end-to-end framework using the loss component and the cross-attention component to produce one or more enriched embeddings. The cross-attention component can determine a contrastive loss between the one or more LLM based sentence embeddings and the one or more speech-based embeddings. Additionally, the cross-attention component can use non-contextual (NC) embeddings as queries to align the one or more LLM based sentence embeddings with the one or more speech-based embeddings.

In other embodiments, the ASR system can be adapted to perform a Spoken Language Understanding (SLU) task. The cross-attention component can create speech-based embeddings that can be aligned with the one or more LLM based sentence embeddings, and the speech-based embeddings can be fused with one or more ASR based embeddings. Additionally, the cross-attention component can create a speech-based summary token to approximate the one or more LLM based sentence embeddings to determine an SLU loss. A gating mechanism can integrate the speech-based summary token along with other embeddings of an end-to-end ASR model to improve a final training loss.

An advantage of the above-indicated system can be providing improved ASR performance by using a fine-grained, tokenwise knowledge transfer from the LLM based sentence embeddings (e.g., BERT). The ASR system's filling performance can be improved by explicitly incorporating the knowledge from the LLM acquired during the ASR pretraining stage into the SLU fine-tuning stage by utilizing a self-attention layer for SLU training (e.g., acting as a proxy for a LLM and can be seeded through the pretraining stage). In this way, the above-indicated system can be significantly more compact and can use about 300 hours of speech pretraining data.

According to an embodiment, a computer-implemented method can comprise deriving, by a system operatively coupled to a processor, one or more speech-based embeddings from an utterance via a speech encoder. The computer-implemented method can further comprise aligning at a token level, by the system, one or more Large Language Model (LLM) embeddings with the one or more speech-based embeddings. The computer implemented method can comprise combining, by the system, an alignment loss and an Automatic Speech Recognition (ASR) loss. Additionally, the computer implements method can comprise training, by the system, an ASR system with an end-to-end framework using alignment loss, the ASR loss, and the one or more LLM based sentence embeddings aligned with the one or more speech-based embeddings to produce one or more enriched embeddings.

According to another embodiment, the computer-implemented method can comprise determining, by the system, a contrastive loss between the one or more LLM based sentence embeddings and the one or more speech-based embeddings. Additionally, the computer-implemented method can comprise using, by the system, non-contextual embeddings as queries to align the one or more LLM based sentence embeddings with the one or more speech-based embeddings. The computer-implemented method can comprise adapting, by the system, the ASR system to perform a Spoken Language Understanding (SLU) task.

According to yet another embodiment, the computer-implemented method can comprise creating, by the system, speech-based embeddings that can be aligned with the one or more LLM based sentence embeddings; and fusing, by the system, the speech-based embeddings with one or more ASR based embeddings. The computer-implemented method can comprise creating, by the system, a speech-based summary token to approximate the one or more LLM based sentence embeddings to determine an SLU loss. Further, the computer-implemented method can comprise integrating, by the system, the speech-based summary token along with other embeddings of an end-to-end ASR model to improve a final training loss.

An advantage of the above-indicated method can be providing improved ASR performance by using a fine-grained, tokenwise knowledge transfer from the LLM based sentence embeddings (e.g., BERT). The ASR system's slot filling performance can be improved by explicitly incorporating the knowledge from the LLM acquired during the ASR pretraining stage into the SLU fine-tuning stage by utilizing a self-attention layer for SLU training (e.g., acting as a proxy for a LLM and can be seeded through the pretraining stage). In this way, the above-indicated method can be significantly more compact and can use about 300 hours of speech pretraining data.

According to another embodiment, a computer program product comprising a computer readable storage medium having program instructions embodied therewith, the program instructions executable by a processor to cause the processor to derive, by the processor, one or more speech-based embeddings from an utterance via a speech encoder. The computer program product can additionally cause the processor to align at a token level, by the processor, one or more Large Language Model (LLM) embeddings with the one or more speech-based embeddings. The computer program product can cause the processor to combine, by the processor, an alignment loss and an Automatic Speech Recognition (ASR) loss. In further embodiments, the computer program product can cause the processor to train, by the processor, an Automatic Speech Recognition (ASR) system, with an end-to-end framework using the alignment loss, the ASR loss, and the one or more LLM based sentence embeddings aligned with the one or more speech-based embeddings to produce one or more enriched embeddings.

According to yet another embodiment, the computer program product can cause the processor to determine, by the processor, a contrastive loss between the one or more LLM based sentence embeddings and the one or more speech-based embeddings. Additionally, the computer program product can cause the processor to use, by the processor, non-contextual embeddings as queries to align the one or more LLM based sentence embeddings with the one or more speech-based embeddings. The computer program product can cause the processor to adapt, by the processor, the ASR system to perform a Spoken Language Understanding (SLU) task.

Additionally, the computer program product can cause the processor to create, by the processor, speech-based embeddings that can be aligned with the one or more LLM based sentence embeddings; and fuse, by the processor, the speech-based embeddings with one or more ASR based embeddings.

In further embodiments, the computer program product can cause the processor to create, by the processor, a speech-based summary token to approximate the one or more LLM based sentence embeddings to determine an SLU loss. In other embodiments, the computer program product can cause the processor to integrate, by the processor, the speech-based summary token along with other embeddings of an end-to-end ASR model to improve a final training loss.

DETAILED DESCRIPTION

Figure 1:
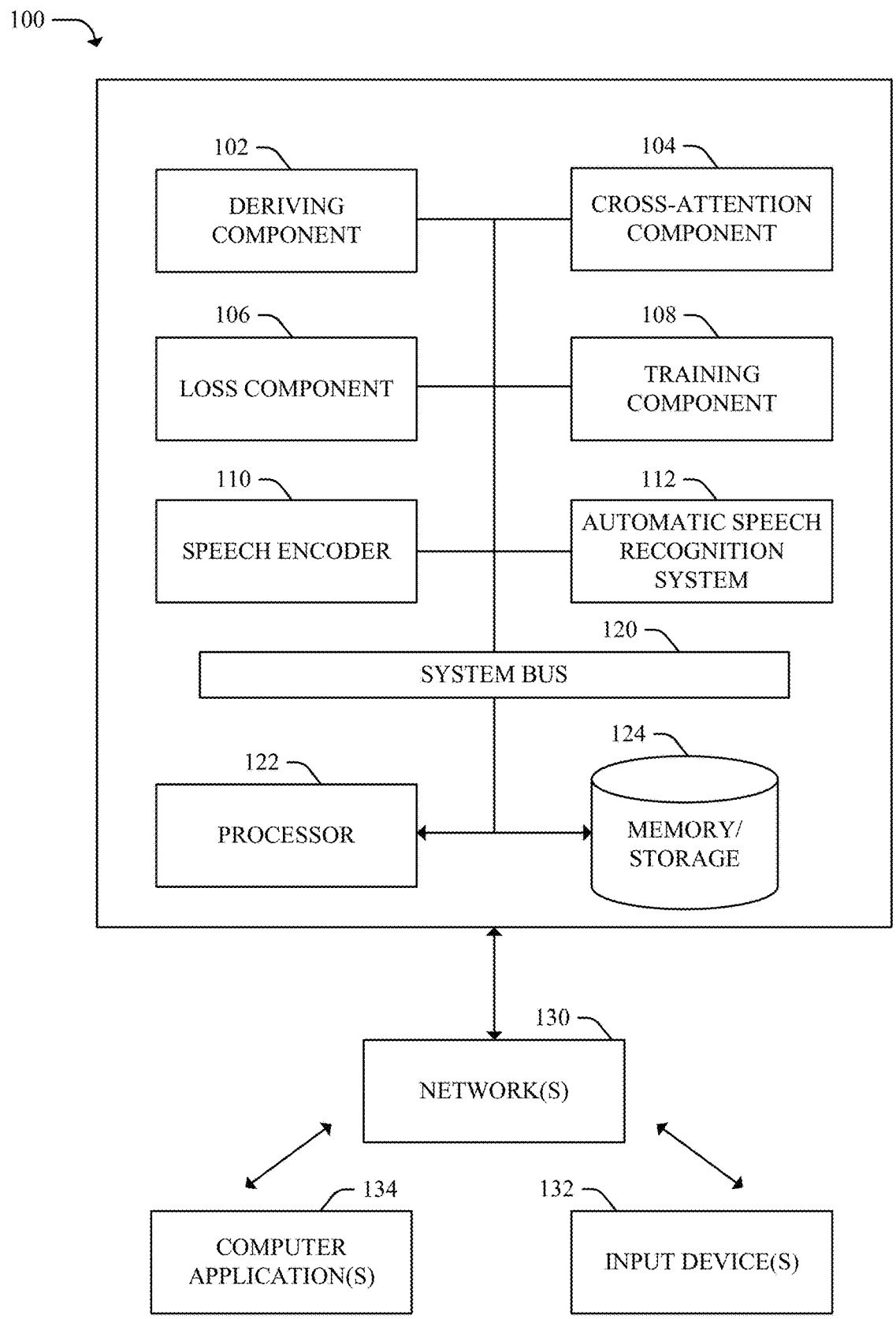
FIG. 1 illustrates a block diagram of an example, non-limiting system that can facilitate fine-grained textual knowledge transfer to improve speech recognition and understanding in accordance with one or more embodiments described herein.

The following detailed description is merely illustrative and is not intended to limit embodiments and/or application or uses of embodiments. Furthermore, there is no intention to be bound by any expressed or implied information presented in the preceding Background or Summary sections, or in the Detailed Description section.

One or more embodiments are now described with reference to the drawings, where like referenced numerals are used to refer to like elements throughout. In the following description, for purposes of explanation, numerous specific details are set forth in order to provide a more thorough understanding of the one or more embodiments. It is evident, however, in various cases, that the one or more embodiments can be practiced without these specific details.

As referenced herein, an "entity" can comprise a client, a user, a computing device, a software application, an agent, a machine learning (ML) model, an artificial intelligence (AI) model, and/or another entity.

Use of spoken language understanding (SLU) has great potential to address a variety of problems in a number of different domains. For example, spoken language understanding can enable speech to be used as an input in various computer products or allow for an entity to control a device through voice commands. Use of dialogue history can be used to improve spoken language understanding by providing context for a speech utterance.

In order to improve performance, existing spoken language understanding systems utilize dialog history in order to resolve ambiguities, co-references, and co-occurrences of the same word. However, existing spoken language understanding systems use dialog history in text form in conjunction with an automatic speech recognition (ASR) component and a natural language understanding (NLU) component. Existing ASR and NLU models are inherently large, having large memory and storage usage, and a model implementing both causes cascading, which leads to an even larger overall model size and can degrade performance of spoken language understanding.

Given problems described above with existing SLU technologies, the present disclosure can be implemented to produce a solution to these problems in the form of systems, computer-implemented methods, and/or computer program products that can facilitate end-to-end integration of dialog history for spoken language understanding by: encoding speech-based content of an utterance and text-based content of the utterance into a uniform representation.

In some embodiments, the present disclosure can be implemented to produce a solution to the problems described above in the form of systems, computer-implemented methods, and/or computer program products that can further facilitate end-to-end integration of dialog history for spoken language understanding by: encoding the utterance and speech-based context of the utterance and the text of the utterance and text-based context of the utterance. An advantage of such systems, computer-implemented methods, and/or computer program products is that they can be used as a hierarchical model with lower level encoder and an upper level encoder, which facilitates end-to-end integration of dialogue history in spoken form.

In embodiments, RNN Transducer technology is common for building deployable models for end-to-end (E2E) automatic speech recognition (ASR) and spoken language understanding (SLU). Since these E2E models operate on speech directly, there can remain a potential to improve performance using purely text based models (Large Language Models like BERT, that have strong language understanding capabilities). Transformer based language models (LLMs like BERT) can have a good semantic understanding of language as evidenced by performance on various language understanding tasks. With other examples, other modern E2E automatic speech recognition systems can be trained without explicit criterion for understanding LLM semantics, such as BERT. The lack of such knowledge can lead to underperformance in downstream E2E spoken language understanding (SLU) tasks. Transformer based speech encoders, such as HuBERT, can be trained using the masked language modelling criterion like BERT, and can perform well in ASR and SLU tasks. However, in the real-world settings, which can involve many on-device deployment, their use can be constrained by their large size and audio processing latency. Thus, it can be desired to devise methods for efficient knowledge transfer from existing models (e.g., BERT) into conventional speech models (e.g., RNN-T transducers) which can be compact and deployment friendly. There has been an interest in exploring techniques to distill semantic knowledge from BERT into speech processing models. In examples, some approaches can propose distillation techniques so that ASR performance can be improved by transferring knowledge into the text generation module of the ASR model (e.g., such can be trivial to do a token by token comparison with BERT's output). Such techniques can improve ASR accuracy, but it can be unclear how they are useful for SLU, where decoding targets can be a sequence of slots and values instead of a natural language text. Thus, knowledge gained from natural language sentences during ASR training cannot transfer to a sequence of slots and values which can occupy a different semantic space.

With examples, another approach can comprise focusing on utilizing BERT's knowledge for E2E speech-to-intent (S2I) tasks. Such can be done by learning an embedding level alignment between the text representation from BERT and the speech representation from the speech encoder. For S2I tasks, speech embeddings (e.g., aligned with BERT embeddings) can be fed forwards into a classifier which can predict an intent. However, it is unclear how above techniques can help with slot filling which can involve a full decoding of a sequence of slots and values.

FIG. 1 illustrates a block diagram of an example, non-limiting fine-grained textual knowledge transfer system 100 that comprises a deriving component 102, a cross-attention component 104, a loss component 106, a training component 108, a speech encoder 110, and an ASR system 112. Additionally, the deriving component 102 can derive one or more speech-based embeddings from an utterance via the speech encoder 110. The cross-attention component 104 can align, at a token level, one or more LLM based sentence embeddings with the one or more speech-based embeddings. Further, in examples, the loss component 106 can combine an alignment loss and an ASR loss. The training component 108 can train an ASR system 112 with an end-to-end framework using the loss component 106 and the cross-attention component 104 to produce one or more enriched embeddings (e.g., h(t)). Repetitive description of like elements employed in other embodiments described herein is omitted for sake of brevity. Aspects of systems (e.g., the fine-grained textual knowledge transfer system 100 and the like), apparatuses or processes in various embodiments of the present invention can constitute one or more machine-executable components embodied within one or more machines (e.g., embodied in one or more computer readable mediums (or media) associated with one or more machines). Such components, when executed by the one or more machines (e.g., computers, computing devices, virtual machines, a combination thereof, and/or the like) can cause the machines to perform the operations described.

Figure 8:
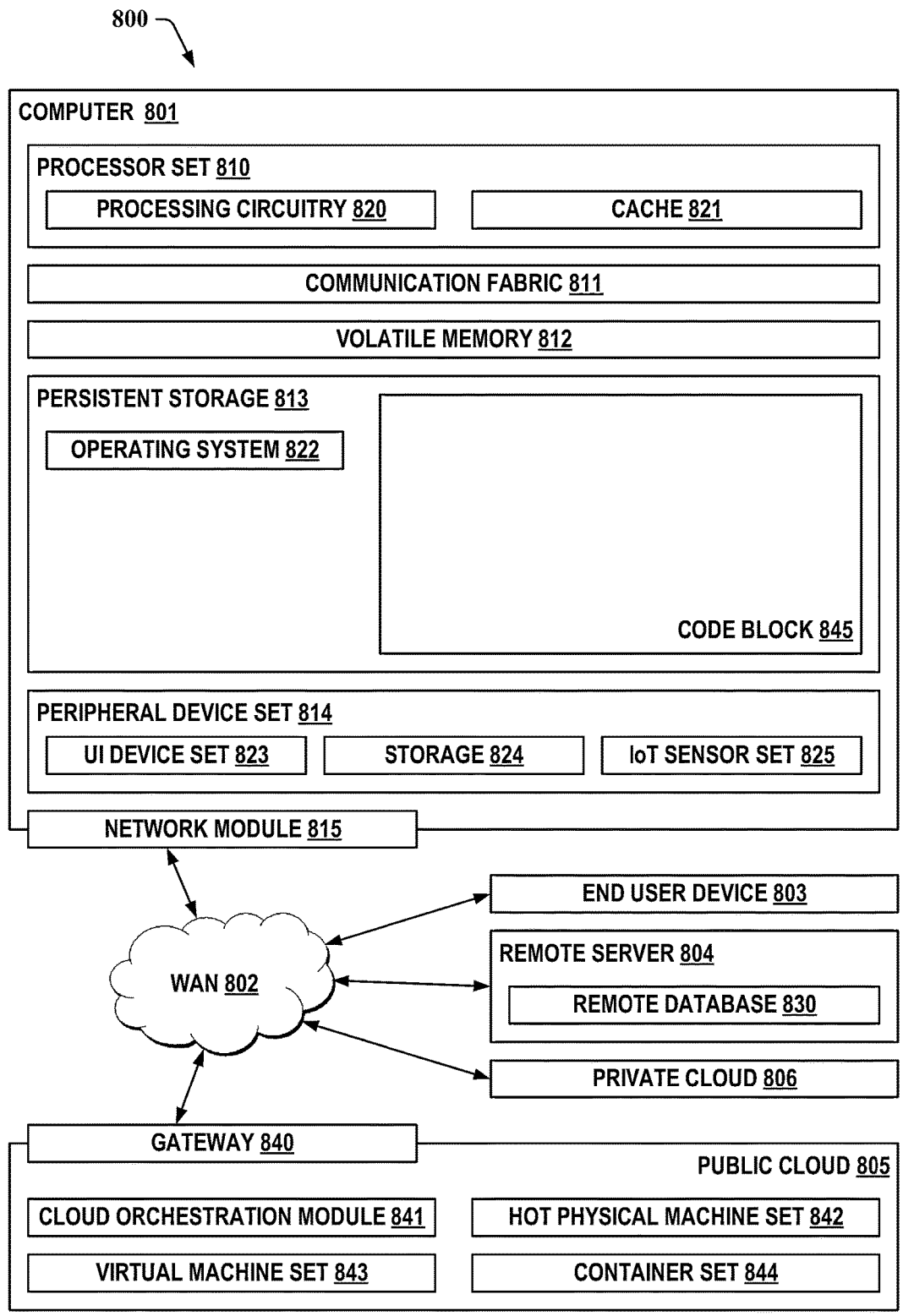
FIG. 8 illustrates a block diagram of an example, non-limiting operating environment in which one or more embodiments described herein can be facilitated.

Additional description of functionalities will be further described below with reference to the example embodiments of FIG. 1, where repetitive description of like elements and/or processes employed in respective embodiments is omitted for sake of brevity. The fine-grained textual knowledge transfer system 100 can facilitate: i) deriving one or more speech-based embeddings from an utterance via the speech encoder 110; ii) aligning, at a token level, one or more LLM based sentence embeddings with the one or more speech-based embeddings; iii) combining an alignment loss and an ASR loss; and iv) training the ASR system 112 with an end-to-end framework using the alignment loss, the ASR loss, and the aligned LLM based sentence embeddings with the one or more speech-based embeddings. The deriving component 102, the cross-attention component 104, the loss component 106, the training component 108, the speech encoder 110, and the ASR system 112 can be associated with a computing environment 800 (FIG. 8).

Discussion first turns briefly to system bus 120, processor 122, and memory 124 of fine-grained textual knowledge transfer system 100. For example, in one or more embodiments, the fine-grained textual knowledge transfer system 100 can comprise processor 122 (e.g., computer processing unit, microprocessor, classical processor, and/or like processor). In one or more embodiments, a component associated with fine-grained textual knowledge transfer system 100, as described herein with or without reference to the one or more figures of the one or more embodiments, can comprise one or more computer and/or machine readable, writable and/or executable components and/or instructions that can be executed by processor 122 to enable performance of one or more processes defined by such component(s) and/or instruction(s).

In one or more embodiments, fine-grained textual knowledge transfer system 100 can comprise a computer-readable memory (e.g., memory 124) that can be operably connected to the processor 122. Memory 124 can store computer-executable instructions that, upon execution by processor 122, can cause processor 122 and/or one or more other components of the fine-grained textual knowledge transfer system 100 (e.g., the deriving component 102, the cross-attention component 104, the loss component 106, the training component 108, the speech encoder 110, and the ASR system 112) to perform one or more actions. In one or more embodiments, memory 124 can store computer-executable components (e.g., the deriving component 102, the cross-attention component 104, the loss component 106, the training component 108, the speech encoder 110, and the ASR system 112).

With embodiments, fine-grained textual knowledge transfer system 100 and/or a component thereof as described herein, can be communicatively, electrically, operatively, optically and/or otherwise coupled to one another via bus 120. Bus 120 can comprise one or more of a memory bus, memory controller, peripheral bus, external bus, local bus, and/or another type of bus that can employ one or more bus architectures. One or more of these examples of bus 120 can be employed. In one or more embodiments, the fine-grained textual knowledge transfer system 100 can be coupled (e.g., communicatively, electrically, operatively, optically and/or like function) to one or more external systems (e.g., a non-illustrated electrical output production system, one or more output targets, an output target controller and/or the like), sources and/or devices (e.g., classical computing devices, communication devices and/or like devices), such as via a network. In one or more embodiments, one or more of the components of the fine-grained textual knowledge transfer system 100 can reside in the cloud, and/or can reside locally in a local computing environment (e.g., at a specified location(s)). In examples, the fine-grained textual knowledge transfer system 100 can be connected with the bus 120, one or more input devices 132, and one or more computer applications 134, which can be associated with cloud computing environment 800 (FIG. 8).

In addition to the processor 122 and/or memory 124 described above, the fine-grained textual knowledge transfer system 100 can comprise one or more computer and/or machine readable, writable and/or executable components and/or instructions that, when executed by processor 122, can enable performance of one or more operations defined by such component(s) and/or instruction(s). The fine-grained textual knowledge transfer system 100 can be associated with, such as accessible via, a computing environment 800 described below with reference to FIG. 8. For example, fine-grained textual knowledge transfer system 100 can be associated with a computing environment 800 such that aspects of processing can be distributed between the fine-grained textual knowledge transfer system 100 and the computing environment 600.

Figure 2:
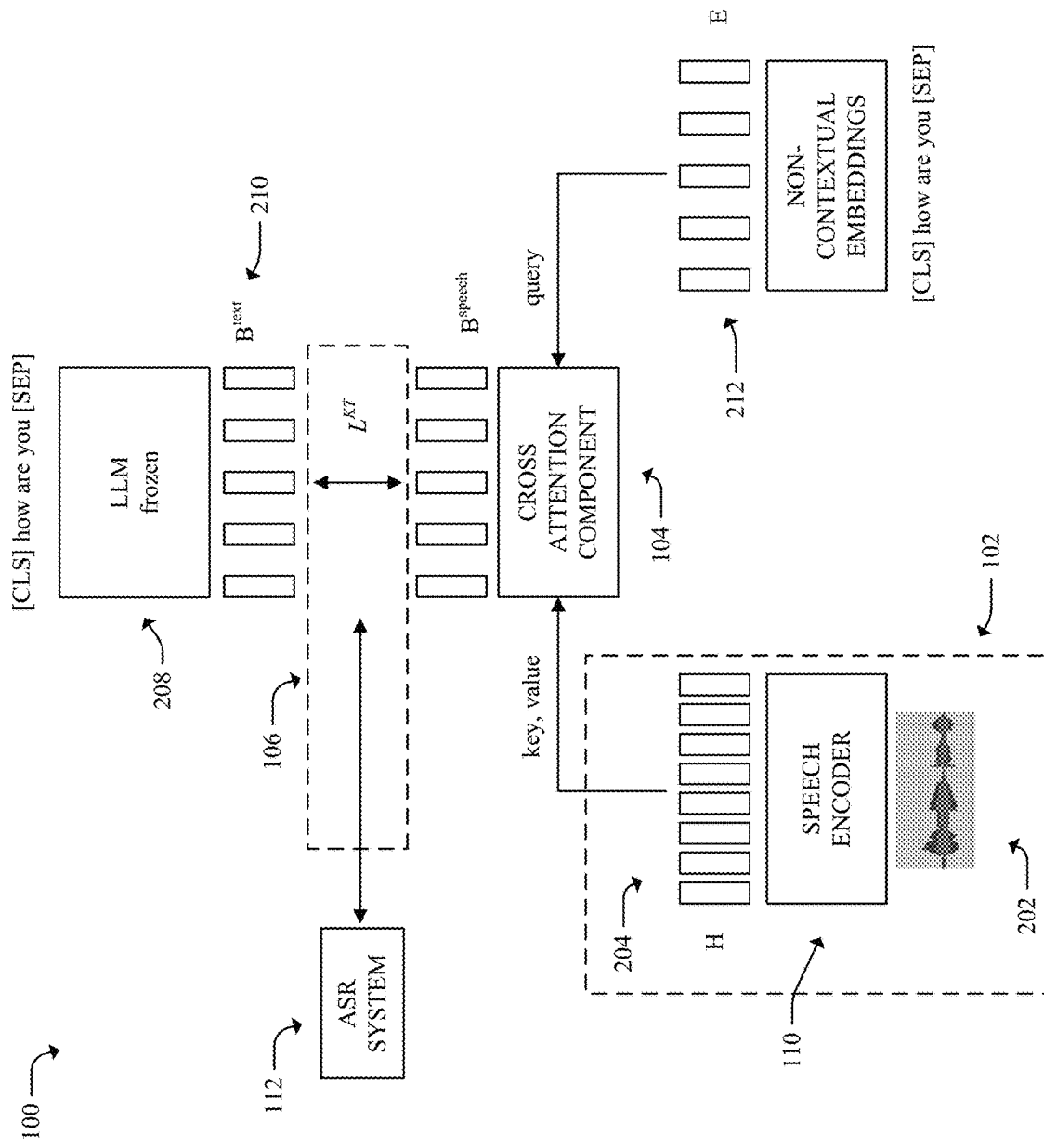
FIG. 2 illustrates a block diagram of an example, non-limiting system that can facilitate fine-grained textual knowledge transfer to improve speech recognition and understanding perform ASR tasks in accordance with one or more embodiments described herein.

In embodiments, FIG. 2 illustrates a block diagram of an example, non-limiting system 100 that can facilitate fine-grained textual knowledge transfer to improve speech recognition and understanding in accordance with one or more embodiments described herein. The system 100 can facilitate integration of the tokenwise contrastive pretraining criterion from knowledge distillation of an LLM (e.g., BERT) into the ASR system.

Figure 3:
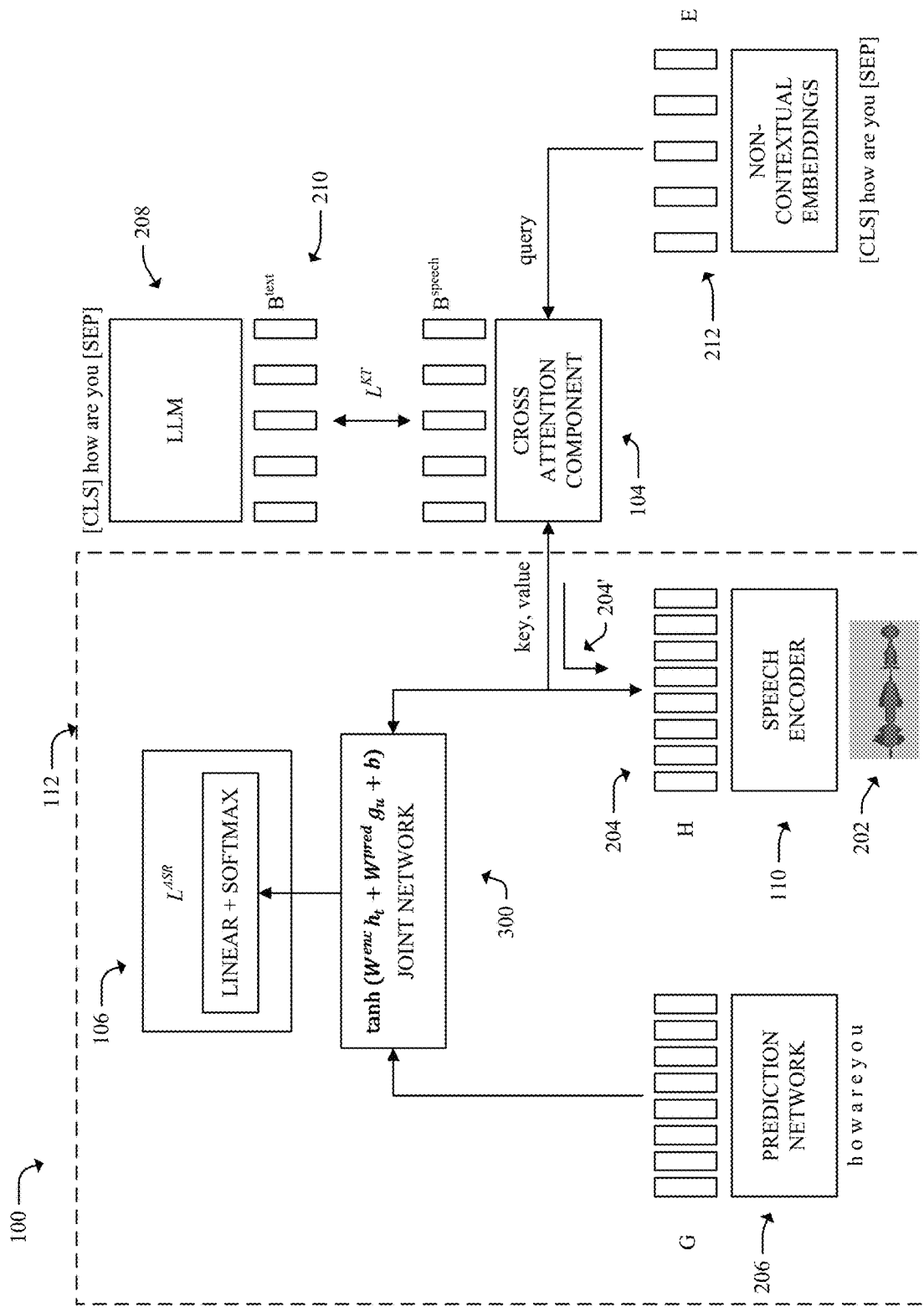
FIG. 3 illustrates a block diagram of an example, non-limiting system that can facilitate fine-grained textual knowledge transfer to improve speech recognition and understanding perform ASR tasks in accordance with one or more embodiments described herein.

With examples, as can be generally illustrated by FIGS. 2 and 3, the cross-attention component 104 can convert a sequence of non-contextual word embeddings to contextual word embeddings by attending to the speech. Each embedding of the word can be taken as a query. Further, the speech output can be examined, where the cross-attention component 104 can search the speech output for the word. In this way, the cross-attention component 104 can scan the utterance 202 to determine the relevant frames. The cross-attention component 104 can output a corresponding vector having a one-to-one correspondence between the output of the large langue model LLM 208 and the speech encoder 110. Additionally, the distances between the two sequences (e.g., the speech-based embeddings 204 and the LLM based sentence embeddings 210) can be minimized by using a loss function (e.g., via the loss component 106.

With embodiments, such as generally illustrated in FIG. 2, the fine-grained textual knowledge transfer system 100 can receive an utterance 202 (e.g., a speech sequence). The utterance 202 (e.g., speech sequence) can be represented by $x=(x_1, \ldots x_T)$ of length T, which the ASR system 112 (e.g., RNN-T) can model the conditional distribution, $p(y|x)$ of output sequence y of length U. Such distribution can be learnt as a marginalization of all possible alignments of length T+U between x and y such that the model can output T BLANK symbols. The input speech sequence (e.g., the utterance 202) can be encoded by the speech encoder 110 (e.g., a transcription network) which can be implemented as a bidirectional LSTM whose output is a sequence of speech-based embeddings 204, $H=[h_1, h_2, \ldots h_T]T$. Similarly, the output grapheme sequence can be encoded by a prediction network 206 (see, e.g., FIG. 3), which can be implemented as a unidirectional LSTM and whose output can be denoted as $G=[g_1, g_2, \ldots g_U]^T$ (e.g., the ASR based embeddings). In examples, such as generally illustrated by FIGS. 2 and 3, a joint network 300 can be used to model the probability distribution over the set of output symbols given a combination of $h_t$ and $g_u$ as:

$$p^{ASR}(. | h_t, g_u) = softmax[W^{out}\tanh(W^{enc}h_t + W^{pred}g_u + b)]$$

The probability of an alignment can be computed using the above distribution, and a marginalization over alignments gives $p(y|x)$. In this case, $W^{out}$, $W^{enc}$, $W^{pred}$, and b can be learnable parameters. Both the output from the prediction network 206 (the ASR-based embeddings) and the speech encoder 110 can be fed into the joint network 300 (e.g., the prediction network 206 can receive a sequence of characters that corresponds to recognized speech associated with the utterance 202). The ASR system 112 can be trained by minimizing the negative log likelihood, $L^{ASR}=-\log p(y|x)$ over the training set. With embodiments, such as illustrated in FIGS. 2 and 3, the non-limiting fine-grained textual knowledge transfer system 100 can transfer one or more LLM based sentence embeddings 210 (e.g., BERT's knowledge) into the encoder network of the ASR system 112. Further, the fine-grained textual knowledge transfer system 100 can utilize a tokenwise contrastive learning criterion. A sequence of non-contextual (WordPiece) embeddings 212 (e.g., with absolute position encodings), E of the utterance 202 can be converted into a sequence of contextual speech-based embeddings, $B^{speech} \in \mathbb{R}^{n \times 768}$ using the cross-attention between the output of the speech encoder 110 (e.g., the transcription network) $H \in \mathbb{R}^{T \times 768}$ and E, via the deriving component 102 and the cross-attention component 104. The cross-attention component 104 can align, token by token, $B^{speech}$ with the output of the LLM 208, $B^{text} \in \mathbb{R}^{n \times 768}$.

In embodiments, the cross-attention component 104 can be query-key-value based and can have a set of learnable weights $W^q$, $W^k$, and $W^v \in \mathbb{R}^{768 \times 768}$. Further, queries, keys, and values can be computed, by the cross-attention component 104 and/or the loss component 106, as the following:

$$Q = EW^q$$
$$K = HW^k$$
$$V = HW^v$$

Additionally, the contextual embeddings, $B^{speech}$, can be computed as $B^{speech}$=softmax(Q $K^T$)V. The contextual speech-based embeddings, $B^{speech}$ can be aligned with one or more LLM based sentence embeddings 210, $B^{text}$ which can both include the same sequence length. In this manner, the non-contextual embeddings can be used as queries. If non-contextual embeddings are not used, the cross-attention component can ignore the context from speech which can cause a failure to learn a meaningful alignment between the speech-based embeddings and the LLM based sentence embeddings 210.

Further, in embodiments, the fine-grained textual knowledge transfer system 100 can compute the alignment between the contextual embeddings (e.g., the speech-based embeddings) and the LLM based sentence embeddings 210. To compute the alignment, the output sequences in a batch can be row-wise concatenated such that $B^{speech}$ and $B^{text}$ are $\in \mathbb{R}^{b \times 768}$ where b can be the sum of sequence lengths in a batch.

In embodiments, the fine-grained textual knowledge transfer system 100 (e.g., the loss component 106 or the training component 108) can compute contrastive loss (e.g., alignment loss) for the system 100 as:

$$L^{KT} = -\frac{\tau}{2b}\sum_{i=1}^{b}\left(\log\frac{\exp\left(\frac{s_{ii}}{\tau}\right)}{\sum_{j=1}^{b}\exp\left(\frac{s_{ij}}{\tau}\right)} + \log\frac{\exp\left(\frac{s_{ii}}{\tau}\right)}{\sum_{j=1}^{b}\exp\left(\frac{s_{ij}}{\tau}\right)}\right)$$

As seen above, $s_{ij}$ is the cosine similarity between the $i^{th}$ row of $B^{text}$ and the $j^{th}$ row of $B^{speech}$ while r can represent temperature. The loss component 106 (e.g., or the training component 108) can train the ASR model 112 via the final loss function $L^{KT} + \lambda L^{ASR}$. Further, as can be seen from the loss function, $\lambda$ scales with the ASR loss. Generally, in most cases, $\lambda$ can be a value of about 0.20 or more or less. With embodiments, as illustrated in FIG. 3, the ASR loss can be combined with the contrastive loss (e.g., the alignment loss) to result in an improved ASR system 112. The ASR system 112 can be coupled with the cross-attention component 104 during training, and for post-training (e.g., during use time), the ASR system 112 can be decoupled from the cross-attention component 104 and the LLM 208 during use time (e.g., when training is not being conducted).

Additionally, as can be seen from FIG. 3, the fine-grained textual knowledge transfer system 100 can generate one or more enriched embeddings 204'. The speech embeddings generated by the speech encoder can be enriched by the alignment loss to result in one or more enriched embeddings 204' (e.g., that can be used with an ASR system 112 and/or an ASR system adapted for SLU tasks/performance). The alignment loss can flow back into the speech encoder 110 therefore the embeddings can be improved (e.g., the alignment loss can be back-propagated into the embeddings). Further, by aligning, knowledge from the LLM 208 can be included into the speech encoder block during training to produce an improved ASR system 112.

Figure 4:
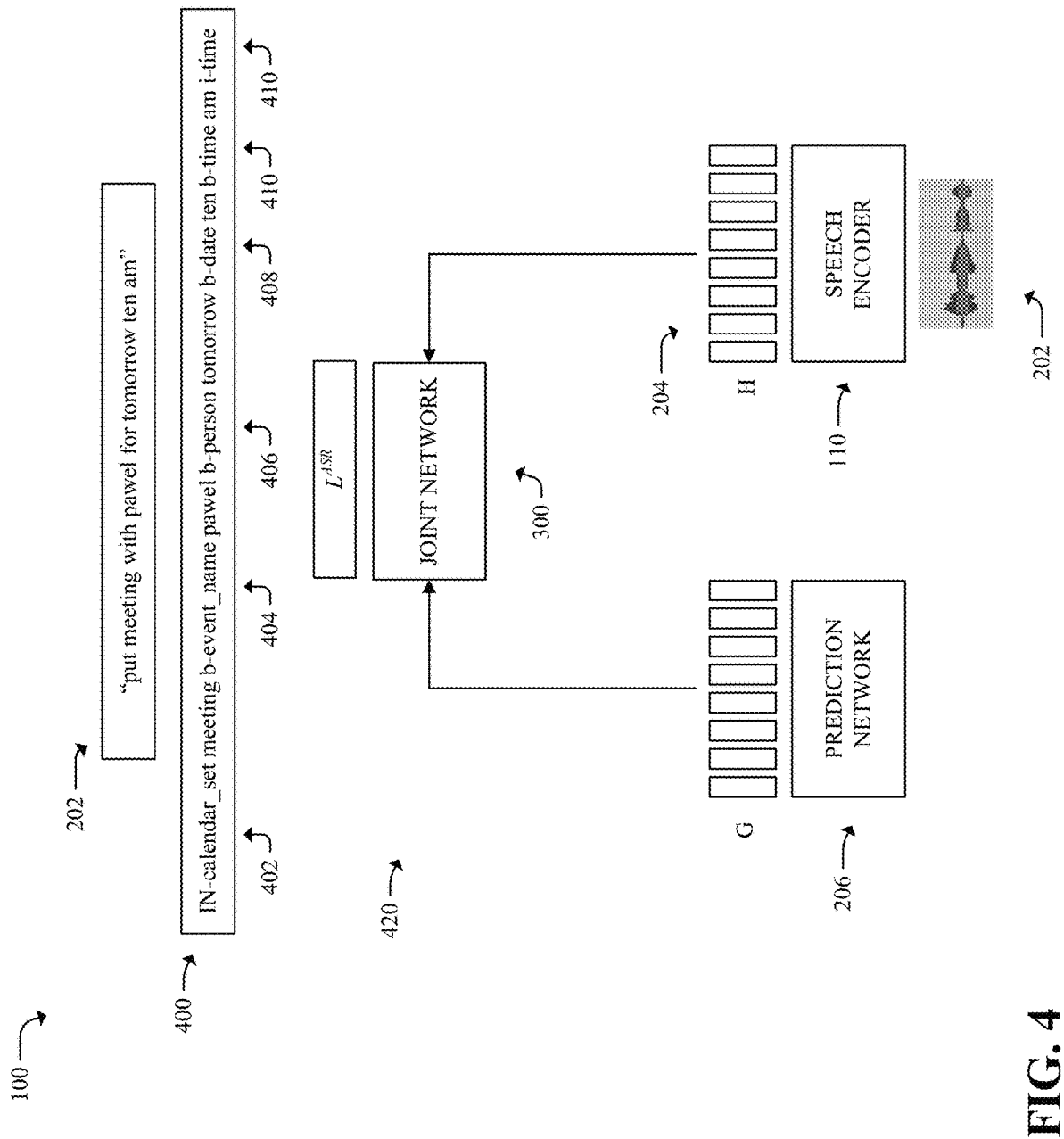
FIG. 4 illustrates a block diagram of an example, non-limiting system that can facilitate fine-grained textual knowledge transfer to improve speech recognition and understanding to perform SLU tasks in accordance with one or more embodiments described herein.
Figure 5:
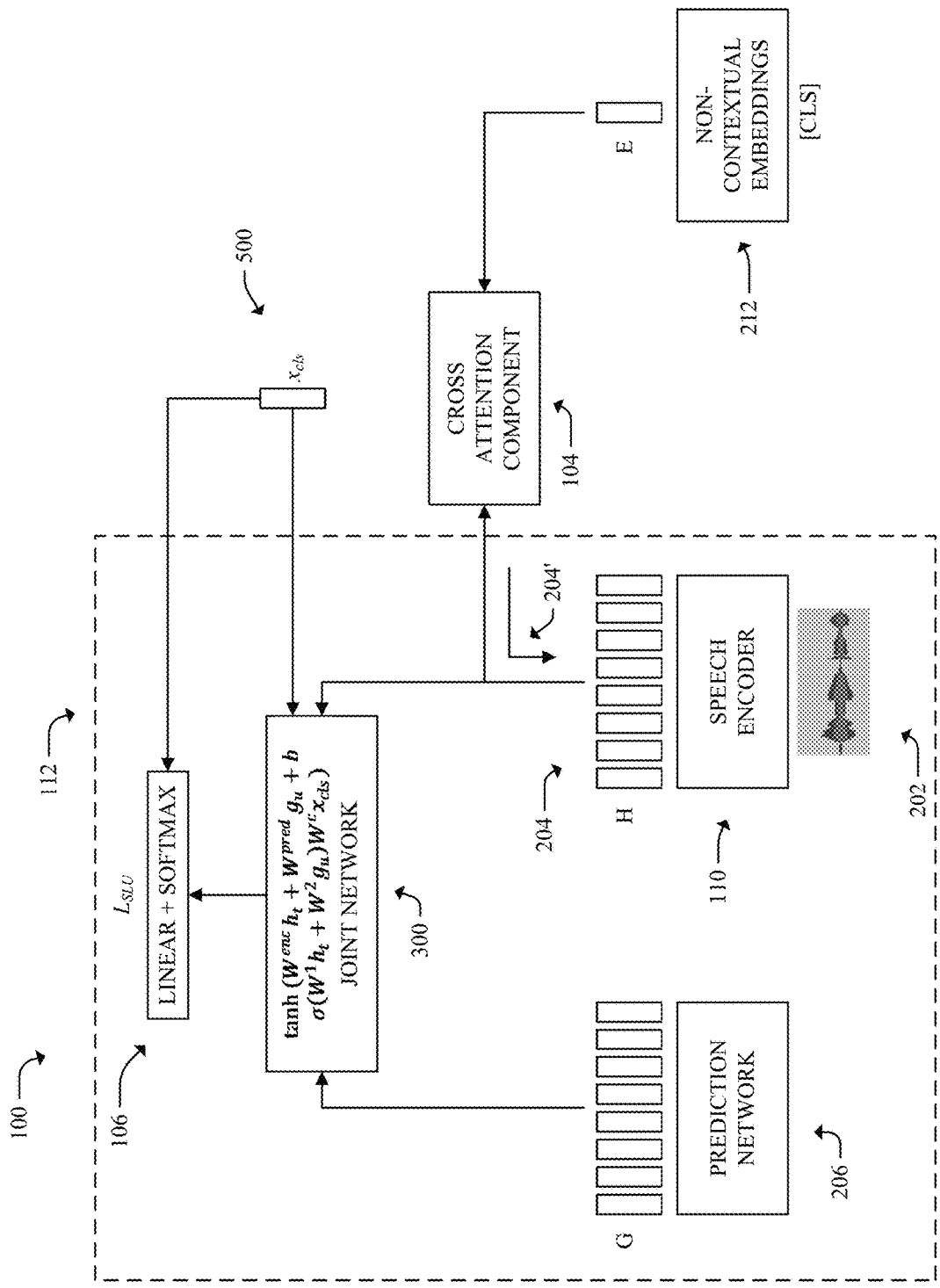
FIG. 5 illustrates a block diagram of an example, non-limiting system that can facilitate fine-grained textual knowledge transfer to improve speech recognition and understanding perform SLU tasks in accordance with one or more embodiments described herein.

Turning generally next to FIGS. 4 and 5, the RNN-T trained for ASR (e.g., ASR system 112) can be adapted for SLU by fine-tuning to produce a sequence of intent, slots, and values. The knowledge gained from the process illustrated by FIGS. 2 and 3 can be utilized for SLU as illustrated in FIGS. 4 and 5. The fine-grained textual knowledge transfer system 100 (e.g., the deriving component 102) can extract one or more various entities from an utterance 202 that are of interest. For example, one or more entities can include various tokens identifying intent, event name, persons, date, and/or time. As can be seen in FIG. 4, when given the utterance 202 "put meeting with pawel for tomorrow ten am", the SLU (e.g., the adapted ASR system 112) can predict a semantic label 400 indicating intent (e.g., setting a calendar) 402, and the following entities: the event name 404, the person 406, the date 408, and the time 410. The semantic label 400 can be a semantic understanding of the language itself and can be generated by an SLU system 420 which can predict the sequence of slots (e.g., to output the first token as the intent token). Once the system 100 can be trained on the ASR objective, the system 100 can be adapted to any dataset to generate this sequence of slots and values that correspond with the SLU task.

Such as can be seen in FIG. 5, the ASR system 112 can be adapted to perform one or more various SLU tasks/operations. During SLU, the cross-attention component 104 can summarize the contents of the speech. For example, the non-contextual embeddings can be used with a speech-based summary token 500 (e.g., a resulting vector that views the entire speech input).

Further, the cross-attention component 104 and the non-contextual embeddings 210 can be used by the fine-grained textual knowledge transfer system 100 to receive/generate the speech-based summary token $x_{cls}$ 500 from the speech encoder 110 (e.g., transcription network). The speech-based summary token $x_{cls}$ 500 can encapsule the meaning of the utterance 202 (e.g., which can be a proxy for one or more BERT-based tokens). The speech-based summary token $x_{cls}$ 500 can be an approximation of the LLM based sentence embedding from the LLM 208 for input utterance 202 and can be used by the adapted ASR system 112 for improved SLU tasks (e.g., to be integrated with the speech-based summary token and other embeddings of an end-to-end ASR model). To do such, the joint network equation of the ASR system 112 can be modified to allow for information to flow from the speech-based summary token $x_{cls}$ 500. Such information flow can be controlled by a gating mechanism that can be a function of $h_t$ and $g_u$. Additionally, $x_{cls}$ can be concatenated in the input to the final classification layer.

With embodiments, the joint network 300 can be modified as reflected in Equation (1):

$$i = \sigma(W^h h_t + W^g g_u + b^i) \odot W^c x_{cls}$$
$$j = \tanh(W^{enc} h_t + W^{pred} g_u + b + i)$$
$$p^{SLU}(.\mid h_t, g_u, x_{cls}) = softmax[W^{out} concat(j, x_{cls})]$$

As such, i can be the information from $x_{cls}$, which can be controlled through a sigmoid gate $\sigma(.)$ where $\odot$ refers to elementwise multiplication. The joint network output (e.g., j) can be concatenated with $x_{cls}$ and fed into the classifier (e.g., via loss component 106 and/or training component 108). The SLU loss, $L^{SLU}$, can be computed in a similar manner as $L^{ASR}$, but over sequences of intent, slots, and values instead of utterance sequence (e.g., the final training loss). Further, the weights $W^h$, $W^g$, $W^c$, and $b^i$ can be newly initialized parameters for SLU. $W_{out}$ can be reused from the pretraining stage and can also include the column of new weights ($W^h$, $W^g$, $W^c$, and $b^i$). With embodiments, the remainder of the parameters can be fine-tuned from the ASR system 112.

In additional embodiments, over 300 hours of the Switchboard dataset can be used to pretrain the ASR system 112. The dataset can be a corpus of dyadic English telephone conversations on open ended topics. The pretrained models can be evaluated on the commonly used Hub5 2000 Switchboard and CallHome test sets. With examples, the pretrained models can be adapted on the recently released SLURP dataset. The SLURP dataset can comprise about 80 hours of training audio (e.g., about 40 synthetic hours). The 10 hours text set of SLURP, including far-field audio, can be challenging for ASR. For SLU, the SLURP dataset can be used, which includes annotations for slots, values, and intents.

Additionally, the following data augmentation techniques can be used to train the models for optimal performance. Speed and temp augmentation: By changing the rate of spoken utterances by 1.1 and 0.9, the original dataset can be augmented with additional copies. SpecAugment: Continuous frequency and time intervals of the log-mel spectrogram input can be masked according to the SM policy. Sequence noise injection: The downscaled spectra of a random utterance can be added to the input log-mel. Reverberation (SLURP): reverberation can be added to the synthetic part of the SLURP dataset to make it far field such that the training set can match test conditions.

Further, the speech encoder 110 (e.g., the transcription network) of the ASR system 112 can be modeled s a 6-layer BiLSTM with 1280 hidden units and the prediction network can be modeled as a single layer LSTM with 1024 hidden units. The models can be trained using 40-dimensional, global mean and variance normalized log-mel filterbank features, extracted every 10 ms using a 25 ms window. Such features can be augmented with $\Delta$ and $\Delta^2$ coefficients. Consecutive frames can be stacked and every other fame can be skipped resulting in a 240 dimensional sequence of speech frames. The input to the prediction network can be a sequence of graphemes. The models can be trained with a batch size of 32 on a A100 GPU. The AdamW optimizer and a OneCycleLR policy can be used with the following schedules: ASR pretraining: 60 epochs with a peak learning rate of 5e-4; ASR adaptation: 20 epochs with a peak learning rate of 2e-4; and SLU adaptation: 20 epochs with a peak learning rate of 2e-5. Additionally, Table A includes results for ASR, which includes results on Switchboard (SWB), CallHome (CH); SLURP without synthetic data (SLP) and SLURP with synthetic data (SLP+).

TABLE A

ASR performance in Word Error Rate (WER) using the baseline RNN-T and with proposed knowledge transfer of the fine-grained textual knowledge transfer system 100.

| Model | Pretraining | | Adaptation | |
|---|---|---|---|---|
| | SWB | CH | SLP | SLP+ |
| ASR | 7.3 | 15.7 | 19.6 | 15.8 |
| ASR w/ KT | 7.2 | 14.8 | 18.9 | 14.8 |

The ASR model can be pre-trained on 300 hours of Switchboard data and then can be adapted for the SLURP dataset. For the SLURP dataset, ASR experiments can be run with and without synthetic data. As can be seen from Table A, using knowledge transfer with ASR lowers the word error rate (WER) on all datasets. Although improvement on SWB can be small, more improvements can be noted on other test sets. When trained with SLP+, SOTA performance can be achieved in comparison to previous SOTA being about 15.2% WER.

With embodiments, various SLU results can be seen in Table B where the slot filing F1 (SF), intent classification accuracy (IC), and the number of parameters used (#Params) is measured. The first six rows can refer to baseline models. Rows (7) to (11) can be implementations of E2E models. The E2E models are substantially more compact compared to the baseline models.

TABLE B

SLU performance on SLURP dataset.

| Model | SF | IC | # Params |
|---|---|---|---|
| Baselines | | | |
| (1) Oracle BERT | 88.54 | 94 | 110M |
| (2) Cascaded ASR -> BERT | 74.83 | 86.49 | 172M |
| (3) wav2vec2.0 | 74.62 | 85.34 | 94M |
| (4) CTI | 74.66 | 86.92 | 313M |
| (5) HuBERT base | 75.32 | 87.51 | 94M |
| (6) HuBERT large | 78.92 | 89.38 | 315M |
| E2E Models | | | |
| (7) ASR -> SLU | 74.35 | 83.84 | 62M |
| (8) ASR w /KT -> SLU | 75.90 | 86.43 | 62M |
| (9) ASR w /KT -> SLU w/ KT ($i = 0$) | 76.31 | 87.39 | 65M |
| (10) ASR w /KT -> SLU w/ KT ($i = W^c x_{cls}$) | 76.51 | 87.77 | 65M |
| (11) ASR w /KT -> SLU w/ KT ($i = \sigma(.)W^c x_{cls}$) | 76.96 | 87.95 | 66M |

In examples, such as illustrated in Table B, row (1) represents the oracle BERT model run on ground truth transcripts. The BERT model can be trained to omit IOB tags for corresponding entities in the input and the intent tag at the [CLS] token (e.g., the speech-based summary token). Row (2) represents the traditional ASR NLU cascaded setup where the best performing ASR model can be used to transcribe speech and then use the BERT model to tag the ASR transcript. Compared to row (1), it can be seen that performance drops substantially. Rows (3) to (6) represent a subset of models and performance on SLURP. Row (7) is the baseline E2E SLU model where the ASR model can be trained and adapted for SLU without knowledge transfer techniques. Rows (8) to (11) illustrate variants of the proposed KT techniques. Further, row (8) illustrates the results for a model pretrained for ASR with KT and then adapted for SLU without KT. An improvement in performance can be seen in the SF and IC performance categories, and demonstrates that the KT methodology for ASR can also help with SLU performance. SLU performance can further be improved by incorporating BERT's knowledge, whereby KT can be implemented for SLU. Rows (9) to (11) illustrate variants to such approach.

With embodiments, three difference variants of KT for SLU can be evaluated. As shown earlier, Equation (1) can be set such that i=0, which can reduce the SLU model to an RNN-T which concatenates $x_{cis}$ before the final classification layer. An improvement in row (9) can be seen as compared to row (8). This illustrates that $x_{cis}$ can be similar to BERT's [CLS] embedding and useful for IC and SF. In row (10), the entire information from $x_{cis}$ can be incorporated into the joint network of the RNN-T (e.g., without the gating mechanism of Equation (1)). By doing so, the bias term of the joint network can be changed, which is a constant for any combination of $h_t$ and $g_u$ given the input utterance 202 (e.g., indicating improvement over row (9)). When using the gating mechanism from Equation (1), improved performance can be achieved in terms of both SF and IC due to the information from $x_{cis}$ represented as a function of $h_t$ and $g_u$. Such allows for flexibility in how the knowledge gained from BERT is used by the RNN-T for SLU instead of solely static knowledge integration.

In embodiments, rows (8) to (11) show how each of the techniques contribute to reaching improved performance. The best performing model in row (11) falls short of the SOTA HuBERT model in row (6); however, the model of row (11) is five times smaller than HuBERT large which is an advantage in terms of implementation and utility. Rows (7) to (11) were pretrained on 300 hours of speech from Switchboard, whereas HuBERT large is trained on 60,000 hours of Librilight data demonstrating a more accessible model.

Figure 6:
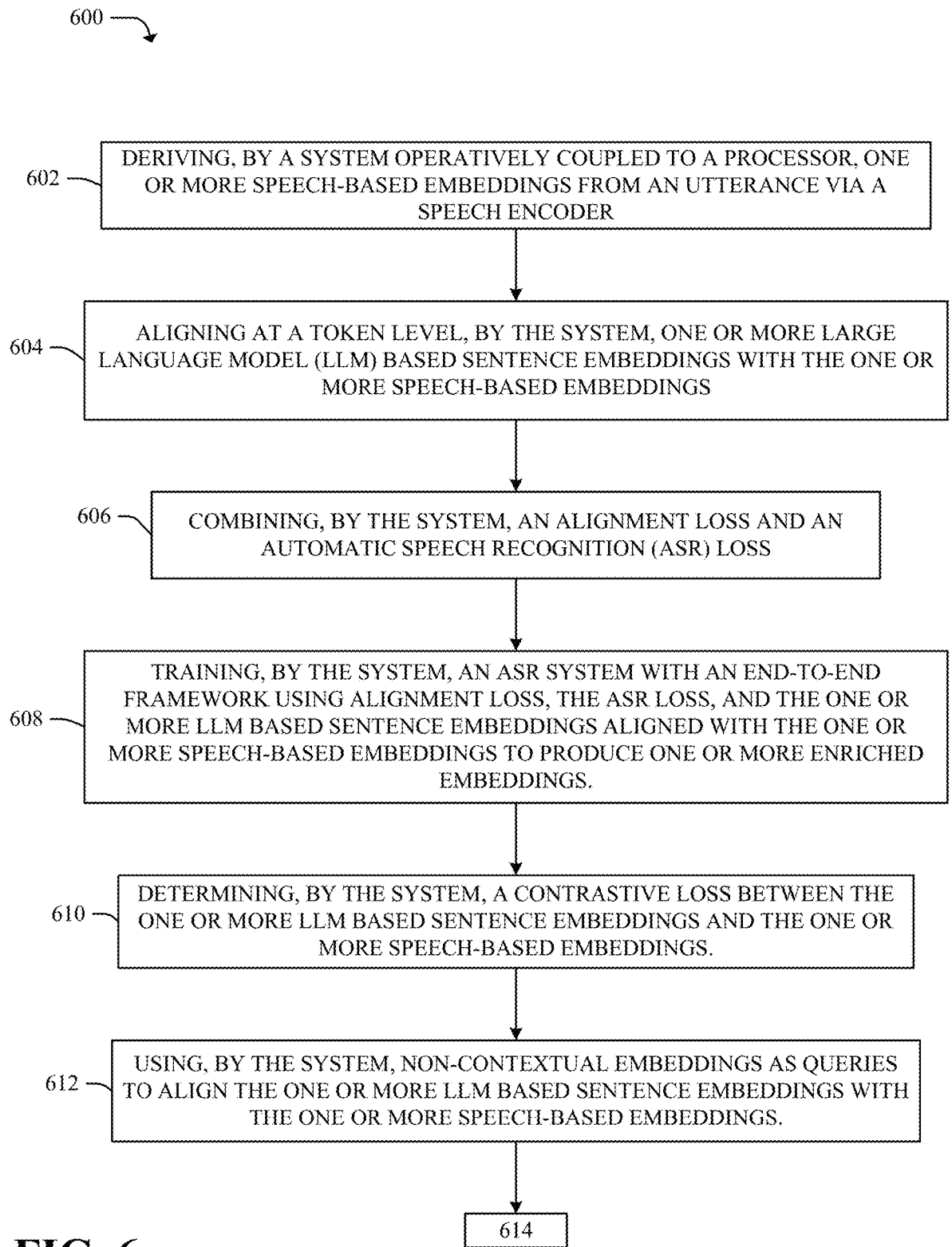
FIG. 6 illustrates a flow diagram of an example, non-limiting computer-implemented method that can facilitate fine-grained textual knowledge transfer to improve speech recognition and understanding in accordance with one or more embodiments described herein.
Figure 7:
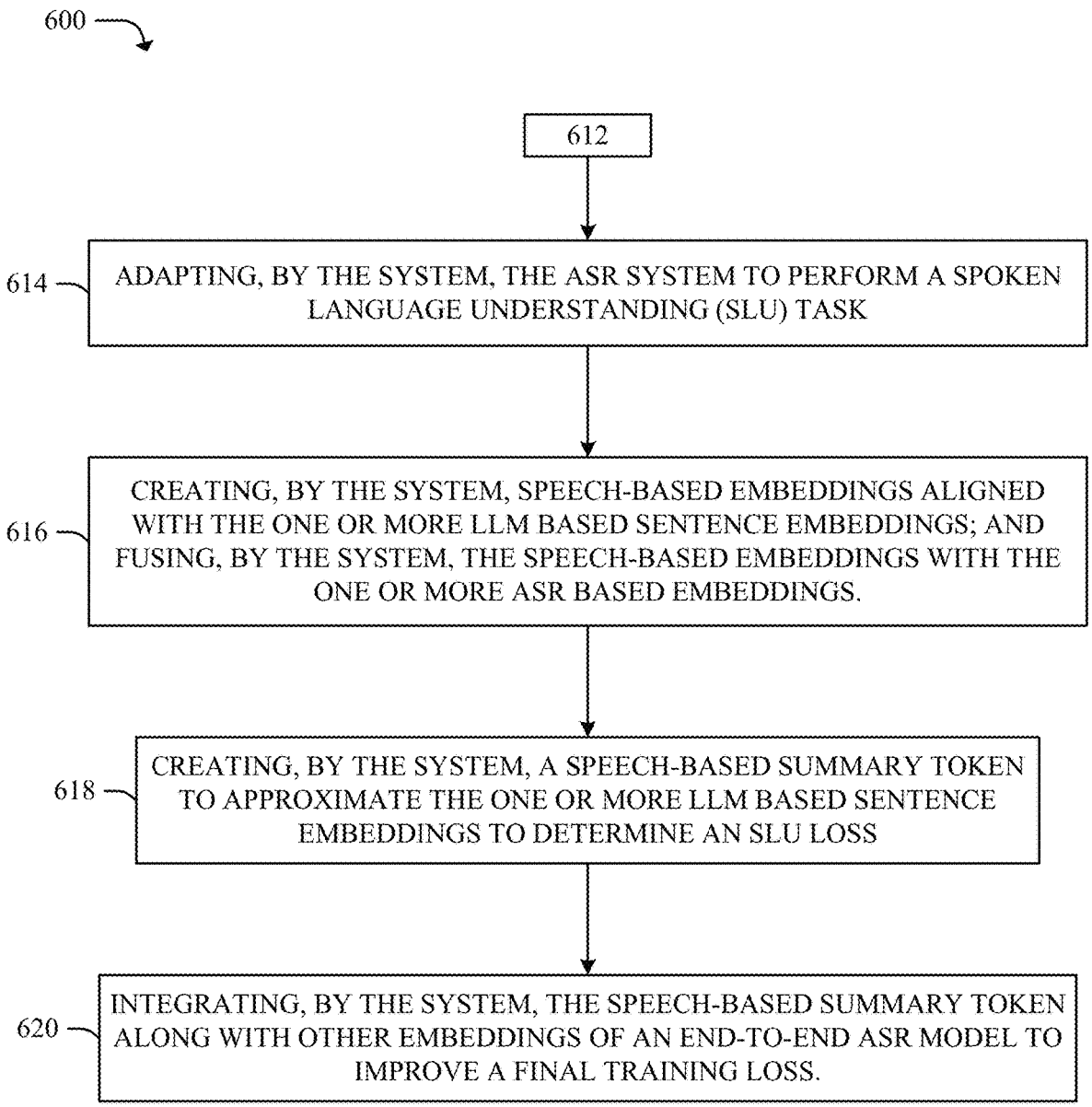
FIG. 7 illustrates a continued flow diagram of an example, non-limiting computer-implemented method that can facilitate fine-grained textual knowledge transfer to improve speech recognition and understanding in accordance with one or more embodiments described herein.

With embodiments, FIGS. 6 and 7 illustrate a flow diagram of an example, non-limiting computer-implemented method 600 that can facilitate fine-grained textual knowledge transfer to improve speech recognition and understanding in accordance with one or more embodiments described herein. Repetitive descriptions of like elements and/or processes employed in respective embodiments is omitted for sake of brevity.

At 602, computer-implemented method 600 can comprise deriving, by a system (e.g., the deriving component 102, the cross-attention component 104, the loss component 106, the training component 108, the speech encoder 110, and/or the ASR system 112) operatively coupled to the processor 122, one or more speech-based embeddings 204 from an utterance 202 via the speech encoder 110.

At 604, computer-implemented method 600 can comprise aligning, at a token level, by the system (e.g., the deriving component 102, the cross-attention component 104, the loss component 106, the training component 108, the speech encoder 110, and/or the ASR system 112) operatively coupled to the processor 122, one or more Large Language Model (LLM) embeddings 212 with the one or more speech-based embeddings 204.

At 606, computer-implemented method 600 can comprise combining, by the system (e.g., the deriving component 102, the cross-attention component 104, the loss component 106, the training component 108, the speech encoder 110, and/or the ASR system 112) operatively coupled to the processor 122, an alignment loss and an Automatic Speech Recognition (ASR) loss.

At 608, computer-implemented method 600 can comprise training, by the system (e.g., the deriving component 102, the cross-attention component 104, the loss component 106, the training component 108, the speech encoder 110, and/or the ASR system 112) operatively coupled to the processor 122, an ASR system with an end-to-end framework using alignment loss, the ASR loss, and the one or more LLM based sentence embeddings 210 aligned with the one or more speech-based embeddings 204 to produce one or more enriched embeddings 112.

At 610, computer-implemented method 600 can comprise determining, by the system (e.g., the deriving component 102, the cross-attention component 104, the loss component 106, the training component 108, the speech encoder 110, and/or the ASR system 112) operatively coupled to the processor 122, a contrastive loss between the one or more LLM based sentence embeddings 210 and the one or more speech-based embeddings 204.

At 612, computer-implemented method 600 can comprise using, by the system (e.g., the deriving component 102, the cross-attention component 104, the loss component 106, the training component 108, the speech encoder 110, and/or the ASR system 112) operatively coupled to the processor 122, non-contextual embeddings as queries to align the one or more LLM based sentence embeddings 210 with the one or more speech-based embeddings 204.

At 614, computer-implemented method 600 can comprise adapting, by the system (e.g., the deriving component 102, the cross-attention component 104, the loss component 106, the training component 108, the speech encoder 110, and/or the ASR system 112) operatively coupled to the processor 122, the ASR system to perform a Spoken Language Understanding (SLU) task.

At 616, computer-implemented method 600 can comprise creating, by the system (e.g., the deriving component 102, the cross-attention component 104, the loss component 106, the training component 108, the speech encoder 110, and/or the ASR system 112) operatively coupled to the processor 122, speech-based embedding that can be aligned with one or more LLM based sentence embeddings 210; and fusing, by the system, the speech-based embeddings with the one or more ASR based embeddings.

At 618, computer-implemented method 600 can comprise creating, by the system (e.g., the deriving component 102, the cross-attention component 104, the loss component 106, the training component 108, the speech encoder 110, and/or the ASR system 112) operatively coupled to the processor 122, a speech-based summary token to approximate the one or more LLM based sentence embeddings 210 to determine an SLU loss.

At 620, computer-implemented method 600 can comprise integrating, by the system (e.g., the deriving component 102, the cross-attention component 104, the loss component 106, the training component 108, the speech encoder 110, and/or the ASR system 112) operatively coupled to the processor 122, the speech-based summary token 500 along with other embeddings of an end-to-end ASR model 112 to improve a final training loss.

For simplicity of explanation, the computer-implemented and non-computer-implemented methodologies provided herein are depicted and/or described as a series of acts. It is to be understood that the subject innovation is not limited by the acts illustrated and/or by the order of acts, for example acts can occur in one or more orders and/or concurrently, and with other acts not presented and described herein. Furthermore, not all illustrated acts can be utilized to implement the computer-implemented and non-computer-implemented methodologies in accordance with the described subject matter. Additionally, the computer-implemented methodologies described hereinafter and throughout this specification are capable of being stored on an article of manufacture to enable transporting and transferring the computer-implemented methodologies to computers. The term article of manufacture, as used herein, is intended to encompass a computer program accessible from any computer-readable device or storage media.

The systems and/or devices have been (and/or will be further) described herein with respect to interaction between one or more components. Such systems and/or components can include those components or sub-components specified therein, one or more of the specified components and/or sub-components, and/or additional components. Sub-components can be implemented as components communicatively coupled to other components rather than included within parent components. One or more components and/or sub-components can be combined into a single component providing aggregate functionality. The components can interact with one or more other components not specifically described herein for the sake of brevity, but known by those of skill in the art.

One or more embodiments described herein can employ hardware and/or software to solve problems that are highly technical, that are not abstract, and that cannot be performed as a set of mental acts by a human. For example, a human, or even thousands of humans, cannot efficiently, accurately and/or effectively mitigate the prorogation of errors from the generative stage to the parser training stage as the one or more embodiments described herein can enable this process. And, neither can the human mind nor a human with pen and paper mitigate the propagation of errors from the generative stage to the parser training stage, as conducted by one or more embodiments described herein.

FIG. 8 illustrates a block diagram of an example, non-limiting operating environment 800 in which one or more embodiments described herein can be facilitated. FIG. 8 and the following discussion are intended to provide a general description of a suitable operating environment 800 in which one or more embodiments described herein at FIGS. 1-7 can be implemented.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Computing environment 800 contains an example of an environment for the execution of at least some of the computer code involved in performing the inventive methods, such as fine-grained textual knowledge transfer code 845. In addition to block 845, computing environment 800 includes, for example, computer 801, wide area network (WAN) 802, end user device (EUD) 803, remote server 804, public cloud 805, and private cloud 806. In this embodiment, computer 801 includes processor set 810 (including processing circuitry 820 and cache 821), communication fabric 811, volatile memory 812, persistent storage 813 (including operating system 822 and block 845, as identified above), peripheral device set 814 (including user interface (UI), device set 823, storage 824, and Internet of Things (IoT) sensor set 825), and network module 815. Remote server 804 includes remote database 830. Public cloud 805 includes gateway 840, cloud orchestration module 841, host physical machine set 842, virtual machine set 843, and container set 844.

COMPUTER 801 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 830. As is well understood in the art of computer technology, and depending upon the technology, performance of a computer-implemented method may be distributed among multiple computers and/or between multiple locations. On the other hand, in this presentation of computing environment 800, detailed discussion is focused on a single computer, specifically computer 801, to keep the presentation as simple as possible. Computer 801 may be located in a cloud, even though it is not shown in a cloud in FIG. 8. On the other hand, computer 801 is not required to be in a cloud except to any extent as may be affirmatively indicated.

PROCESSOR SET 810 includes one, or more, computer processors of any type now known or to be developed in the future. Processing circuitry 820 may be distributed over multiple packages, for example, multiple, coordinated integrated circuit chips. Processing circuitry 820 may implement multiple processor threads and/or multiple processor cores. Cache 821 is memory that is located in the processor chip package(s) and is typically used for data or code that should be available for rapid access by the threads or cores running on processor set 810. Cache memories are typically organized into multiple levels depending upon relative proximity to the processing circuitry. Alternatively, some, or all, of the cache for the processor set may be located "off chip." In some computing environments, processor set 810 may be designed for working with qubits and performing quantum computing.

Computer readable program instructions are typically loaded onto computer 801 to cause a series of operational steps to be performed by processor set 810 of computer 801 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 821 and the other storage media discussed below. The program instructions, and associated data, are accessed by processor set 810 to control and direct performance of the inventive methods. In computing environment 800, at least some of the instructions for performing the inventive methods may be stored in block 845 in persistent storage 813.

COMMUNICATION FABRIC 811 is the signal conduction paths that allow the various components of computer 801 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

VOLATILE MEMORY 812 is any type of volatile memory now known or to be developed in the future. Examples include dynamic type random access memory (RAM) or static type RAM. Typically, the volatile memory is characterized by random access, but this is not required unless affirmatively indicated. In computer 801, the volatile memory 812 is located in a single package and is internal to computer 801, but, alternatively or additionally, the volatile memory may be distributed over multiple packages and/or located externally with respect to computer 801.

PERSISTENT STORAGE 813 is any form of non-volatile storage for computers that is now known or to be developed in the future. The non-volatility of this storage means that the stored data is maintained regardless of whether power is being supplied to computer 801 and/or directly to persistent storage 813. Persistent storage 813 may be a read only memory (ROM), but typically at least a portion of the persistent storage allows writing of data, deletion of data and re-writing of data. Some familiar forms of persistent storage include magnetic disks and solid state storage devices. Operating system 822 may take several forms, such as various known proprietary operating systems or open source Portable Operating System Interface type operating systems that employ a kernel. The code included in block 845 typically includes at least some of the computer code involved in performing the inventive methods.

PERIPHERAL DEVICE SET 814 includes the set of peripheral devices of computer 801. Data communication connections between the peripheral devices and the other components of computer 801 may be implemented in various ways, such as Bluetooth connections, Near-Field Communication (NFC) connections, connections made by cables (such as universal serial bus (USB) type cables), insertion type connections (for example, secure digital (SD) card), connections made though local area communication networks and even connections made through wide area networks such as the internet. In various embodiments, UI device set 823 may include components such as a display screen, speaker, microphone, wearable devices (such as goggles and smart watches), keyboard, mouse, printer, touchpad, game controllers, and haptic devices. Storage 824 is external storage, such as an external hard drive, or insertable storage, such as an SD card. Storage 824 may be persistent and/or volatile. In some embodiments, storage 824 may take the form of a quantum computing storage device for storing data in the form of qubits. In embodiments where computer 801 is required to have a large amount of storage (for example, where computer 801 locally stores and manages a large database) then this storage may be provided by peripheral storage devices designed for storing very large amounts of data, such as a storage area network (SAN) that is shared by multiple, geographically distributed computers. IoT sensor set 825 is made up of sensors that can be used in Internet of Things applications. For example, one sensor may be a thermometer and another sensor may be a motion detector.

NETWORK MODULE 815 is the collection of computer software, hardware, and firmware that allows computer 801 to communicate with other computers through WAN 802. Network module 815 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 815 are performed on the same physical hardware device. In other embodiments (for example, embodiments that utilize software-defined networking (SDN)), the control functions and the forwarding functions of network module 815 are performed on physically separate devices, such that the control functions manage several different network hardware devices. Computer readable program instructions for performing the inventive methods can typically be downloaded to computer 801 from an external computer or external storage device through a network adapter card or network interface included in network module 815.

WAN 802 is any wide area network (for example, the internet) capable of communicating computer data over non-local distances by any technology for communicating computer data, now known or to be developed in the future. In some embodiments, the WAN may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 803 is any computer system that is used and controlled by an end user (for example, a customer of an enterprise that operates computer 801), and may take any of the forms discussed above in connection with computer 801. EUD 803 typically receives helpful and useful data from the operations of computer 801. For example, in a hypothetical case where computer 801 is designed to provide a recommendation to an end user, this recommendation would typically be communicated from network module 815 of computer 801 through WAN 802 to EUD 803. In this way, EUD 803 can display, or otherwise present, the recommendation to an end user. In some embodiments, EUD 803 may be a client device, such as thin client, heavy client, mainframe computer, desktop computer and so on.

REMOTE SERVER 804 is any computer system that serves at least some data and/or functionality to computer 801. Remote server 804 may be controlled and used by the same entity that operates computer 801. Remote server 804 represents the machine(s) that collect and store helpful and useful data for use by other computers, such as computer 801. For example, in a hypothetical case where computer 801 is designed and programmed to provide a recommendation based on historical data, then this historical data may be provided to computer 801 from remote database 830 of remote server 804.

PUBLIC CLOUD 805 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 805 is performed by the computer hardware and/or software of cloud orchestration module 841. The computing resources provided by public cloud 805 are typically implemented by virtual computing environments that run on various computers making up the computers of host physical machine set 842, which is the universe of physical computers in and/or available to public cloud 805. The virtual computing environments (VCEs) typically take the form of virtual machines from virtual machine set 843 and/or containers from container set 844. It is understood that these VCEs may be stored as images and may be transferred among and between the various physical machine hosts, either as images or after instantiation of the VCE. Cloud orchestration module 841 manages the transfer and storage of images, deploys new instantiations of VCEs and manages active instantiations of VCE deployments. Gateway 840 is the collection of computer software, hardware, and firmware that allows public cloud 805 to communicate through WAN 802.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 806 is similar to public cloud 805, except that the computing resources are only available for use by a single enterprise. While private cloud 806 is depicted as being in communication with WAN 802, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 805 and private cloud 806 are both part of a larger hybrid cloud.

The embodiments described herein can be directed to one or more of a system, a method, an apparatus and/or a computer program product at any possible technical detail level of integration. The computer program product can include a computer readable storage medium (or media) having computer readable program instructions thereon for causing a processor to carry out aspects of the one or more embodiments described herein. The computer readable storage medium can be a tangible device that can retain and store instructions for use by an instruction execution device. The computer readable storage medium can be, for example, but is not limited to, an electronic storage device, a magnetic storage device, an optical storage device, an electromagnetic storage device, a superconducting storage device and/or any suitable combination of the foregoing. A non-exhaustive list of more specific examples of the computer readable storage medium can also include the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon and/or any suitable combination of the foregoing. A computer readable storage medium, as used herein, is not to be construed as being transitory signals per se, such as radio waves and/or other freely propagating electromagnetic waves, electromagnetic waves propagating through a waveguide and/or other transmission media (e.g., light pulses passing through a fiber-optic cable), and/or electrical signals transmitted through a wire.

Computer readable program instructions described herein can be downloaded to respective computing/processing devices from a computer readable storage medium and/or to an external computer or external storage device via a network, for example, the Internet, a local area network, a wide area network and/or a wireless network. The network can comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device. Computer readable program instructions for carrying out operations of the one or more embodiments described herein can be assembler instructions, instruction-set-architecture (ISA) instructions, machine instructions, machine dependent instructions, microcode, firmware instructions, state-setting data, configuration data for integrated circuitry, and/or source code and/or object code written in any combination of one or more programming languages, including an object oriented programming language such as Smalltalk, C++ or the like, and/or procedural programming languages, such as the "C" programming language and/or similar programming languages. The computer readable program instructions can execute entirely on a computer, partly on a computer, as a stand-alone software package, partly on a computer and/or partly on a remote computer or entirely on the remote computer and/or server. In the latter scenario, the remote computer can be connected to a computer through any type of network, including a local area network (LAN) and/or a wide area network (WAN), and/or the connection can be made to an external computer (for example, through the Internet using an Internet Service Provider). In one or more embodiments, electronic circuitry including, for example, programmable logic circuitry, field-programmable gate arrays (FPGA) and/or programmable logic arrays (PLA) can execute the computer readable program instructions by utilizing state information of the computer readable program instructions to personalize the electronic circuitry, in order to perform aspects of the one or more embodiments described herein.

Aspects of the one or more embodiments described herein are described with reference to flowchart illustrations and/or block diagrams of methods, apparatus (systems), and computer program products according to one or more embodiments described herein. It will be understood that each block of the flowchart illustrations and/or block diagrams, and combinations of blocks in the flowchart illustrations and/or block diagrams, can be implemented by computer readable program instructions. These computer readable program instructions can be provided to a processor of a general-purpose computer, special purpose computer and/or other programmable data processing apparatus to produce a machine, such that the instructions, which execute via the processor of the computer or other programmable data processing apparatus, can create means for implementing the functions/acts specified in the flowchart and/or block diagram block or blocks. These computer readable program instructions can also be stored in a computer readable storage medium that can direct a computer, a programmable data processing apparatus and/or other devices to function in a particular manner, such that the computer readable storage medium having instructions stored therein can comprise an article of manufacture including instructions which can implement aspects of the function/act specified in the flowchart and/or block diagram block or blocks. The computer readable program instructions can also be loaded onto a computer, other programmable data processing apparatus and/or other device to cause a series of operational acts to be performed on the computer, other programmable apparatus and/or other device to produce a computer implemented process, such that the instructions which execute on the computer, other programmable apparatus and/or other device implement the functions/acts specified in the flowchart and/or block diagram block or blocks.

The flowcharts and block diagrams in the figures illustrate the architecture, functionality and/or operation of possible implementations of systems, computer-implementable methods and/or computer program products according to one or more embodiments described herein. In this regard, each block in the flowchart or block diagrams can represent a module, segment and/or portion of instructions, which comprises one or more executable instructions for implementing the specified logical function. In one or more alternative implementations, the functions noted in the blocks can occur out of the order noted in the Figures. For example, two blocks shown in succession can be executed substantially concurrently, and/or the blocks can sometimes be executed in the reverse order, depending upon the functionality involved. It will also be noted that each block of the block diagrams and/or flowchart illustration, and/or combinations of blocks in the block diagrams and/or flowchart illustration, can be implemented by special purpose hardware-based systems that can perform the specified functions and/or acts and/or carry out one or more combinations of special purpose hardware and/or computer instructions.

While the subject matter has been described above in the general context of computer-executable instructions of a computer program product that runs on a computer and/or computers, those skilled in the art will recognize that the one or more embodiments herein also can be implemented at least partially in parallel with one or more other program modules. Generally, program modules include routines, programs, components and/or data structures that perform particular tasks and/or implement particular abstract data types. Moreover, the aforedescribed computer-implemented methods can be practiced with other computer system configurations, including single-processor and/or multiprocessor computer systems, mini-computing devices, mainframe computers, as well as computers, hand-held computing devices (e.g., PDA, phone), and/or microprocessor-based or programmable consumer and/or industrial electronics. The illustrated aspects can also be practiced in distributed computing environments in which tasks are performed by remote processing devices that are linked through a communications network. However, one or more, if not all aspects of the one or more embodiments described herein can be practiced on stand-alone computers. In a distributed computing environment, program modules can be located in both local and remote memory storage devices.

As used in this application, the terms "component," "system," "platform" and/or "interface" can refer to and/or can include a computer-related entity or an entity related to an operational machine with one or more specific functionalities. The entities described herein can be either hardware, a combination of hardware and software, software, or software in execution. For example, a component can be, but is not limited to being, a process running on a processor, a processor, an object, an executable, a thread of execution, a program and/or a computer. By way of illustration, both an application running on a server and the server can be a component. One or more components can reside within a process and/or thread of execution and a component can be localized on one computer and/or distributed between two or more computers. In another example, respective components can execute from various computer readable media having various data structures stored thereon. The components can communicate via local and/or remote processes such as in accordance with a signal having one or more data packets (e.g., data from one component interacting with another component in a local system, distributed system and/or across a network such as the Internet with other systems via the signal). As another example, a component can be an apparatus with specific functionality provided by mechanical parts operated by electric or electronic circuitry, which is operated by a software and/or firmware application executed by a processor. In such a case, the processor can be internal and/or external to the apparatus and can execute at least a part of the software and/or firmware application. As yet another example, a component can be an apparatus that provides specific functionality through electronic components without mechanical parts, where the electronic components can include a processor and/or other means to execute software and/or firmware that confers at least in part the functionality of the electronic components. In an aspect, a component can emulate an electronic component via a virtual machine, e.g., within a cloud computing system.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form. As used herein, the terms "example" and/or "exemplary" are utilized to mean serving as an example, instance, or illustration. For the avoidance of doubt, the subject matter described herein is not limited by such examples. In addition, any aspect or design described herein as an "example" and/or "exemplary" is not necessarily to be construed as preferred or advantageous over other aspects or designs, nor is it meant to preclude equivalent exemplary structures and techniques known to those of ordinary skill in the art.

As it is employed in the subject specification, the term "processor" can refer to substantially any computing processing unit and/or device comprising, but not limited to, single-core processors; single-processors with software multithread execution capability; multi-core processors; multi-core processors with software multithread execution capability; multi-core processors with hardware multithread technology; parallel platforms; and/or parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, and/or any combination thereof designed to perform the functions described herein. Further, processors can exploit nano-scale architectures such as, but not limited to, molecular and quantum-dot based transistors, switches and/or gates, in order to optimize space usage and/or to enhance performance of related equipment. A processor can be implemented as a combination of computing processing units.

Herein, terms such as "store," "storage," "data store," data storage," "database," and substantially any other information storage component relevant to operation and functionality of a component are utilized to refer to "memory components," entities embodied in a "memory," or components comprising a memory. Memory and/or memory components described herein can be either volatile memory or nonvolatile memory or can include both volatile and nonvolatile memory. By way of illustration, and not limitation, nonvolatile memory can include read only memory (ROM), programmable ROM (PROM), electrically programmable ROM (EPROM), electrically erasable ROM (EEPROM), flash memory and/or nonvolatile random-access memory (RAM) (e.g., ferroelectric RAM (FeRAM). Volatile memory can include RAM, which can act as external cache memory, for example. By way of illustration and not limitation, RAM can be available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), direct Rambus RAM (DRRAM), direct Rambus dynamic RAM (DRDRAM) and/or Rambus dynamic RAM (RDRAM). Additionally, the described memory components of systems and/or computer-implemented methods herein are intended to include, without being limited to including, these and/or any other suitable types of memory.

What has been described above includes mere examples of systems and computer-implemented methods. It is, of course, not possible to describe every conceivable combination of components and/or computer-implemented methods for purposes of describing the one or more embodiments, but one of ordinary skill in the art can recognize that many further combinations and/or permutations of the one or more embodiments are possible. Furthermore, to the extent that the terms "includes," "has," "possesses," and the like are used in the detailed description, claims, appendices and/or drawings such terms are intended to be inclusive in a manner similar to the term "comprising" as "comprising" is interpreted when employed as a transitional word in a claim.

The descriptions of the various embodiments have been presented for purposes of illustration but are not intended to be exhaustive or limited to the embodiments described herein. Many modifications and variations will be apparent to those of ordinary skill in the art without departing from the scope and spirit of the described embodiments. The terminology used herein was chosen to best explain the principles of the embodiments, the practical application and/or technical improvement over technologies found in the marketplace, and/or to enable others of ordinary skill in the art to understand the embodiments described herein.

What is claimed is:

1. A system comprising:
   a processor that executes computer-executable components stored in a non-transitory computer-readable memory, wherein the computer-executable components comprise:
   a deriving component that derives one or more speech-based embeddings from an utterance via a speech encoder;
   a cross-attention component that aligns, at a token level, one or more Large Language Model (LLM) based sentence embeddings with the one or more speech-based embeddings;
   a loss component that combines an alignment loss and an Automatic Speech Recognition (ASR) loss; and
   a training component that trains an ASR system with an end-to-end framework using the loss component and the cross-attention component to produce one or more enriched embeddings.

2. The system of claim 1, wherein the cross-attention component determines a contrastive loss between the one or more LLM based sentence embeddings and the one or more speech-based embeddings.

3. The system of claim 1, wherein the cross-attention component uses non-contextual (NC) embeddings as queries to align the one or more LLM based sentence embeddings with the one or more speech-based embeddings.

4. The system of claim 1, wherein the ASR system is adapted to perform a Spoken Language Understanding (SLU) task.

5. The system of claim 4, wherein the cross-attention component creates speech-based embeddings that are aligned with the one or more LLM based sentence embeddings, and the speech-based embeddings are fused with one or more ASR based embeddings.

6. The system of claim 5, wherein the cross-attention component creates a speech-based summary token to approximate the one or more LLM based sentence embeddings to determine an SLU loss.

7. The system of claim 6, wherein a gating mechanism integrates the speech-based summary token along with other embeddings of an end-to-end ASR model to improve a final training loss.

8. A computer-implemented method comprising:
deriving, by a system operatively coupled to a processor, one or more speech-based embeddings from an utterance via a speech encoder;
aligning at a token level, by the system, one or more Large Language Model (LLM) based sentence embeddings with the one or more speech-based embeddings;
combining, by the system, an alignment loss and an Automatic Speech Recognition (ASR) loss; and
training, by the system, an ASR system with an end-to-end framework using alignment loss, the ASR loss, and the one or more LLM based sentence embeddings aligned with the one or more speech-based embeddings to produce one or more enriched embeddings.

9. The computer-implemented method of claim 8, further comprising:
determining, by the system, a contrastive loss between the one or more LLM based sentence embeddings and the one or more speech-based embeddings.

10. The computer-implemented method of claim 8, further comprising:
using, by the system, non-contextual embeddings as queries to align the one or more LLM based sentence embeddings with the one or more speech-based embeddings.

11. The computer-implemented method of claim 8, further comprising:
adapting, by the system, the ASR system to perform a Spoken Language Understanding (SLU) task.

12. The computer-implemented method of claim 11, further comprising:
creating, by the system, speech-based embeddings aligned with the one or more LLM based sentence embeddings, and
fusing, by the system, the speech-based embeddings with one or more ASR based embeddings.

13. The computer-implemented method of claim 12, further comprising:
creating, by the system, a speech-based summary token to approximate the one or more LLM based sentence embeddings to determine an SLU loss.

14. The computer-implemented method of claim 13, further comprising:
integrating, by the system, the speech-based summary token along with other embeddings of an end-to-end ASR model to improve a final training loss.

15. A computer program product comprising a non-transitory computer readable memory having program instructions embodied therewith, the program instructions executable by a processor to cause the processor to:
derive, by the processor, one or more speech-based embeddings from an utterance via a speech encoder;
align at a token level, by the processor, one or more Large Language Model (LLM) based sentence embeddings with the one or more speech-based embeddings;
combine, by the processor, an alignment loss and an Automatic Speech Recognition (ASR) loss; and
train, by the processor, an Automatic Speech Recognition (ASR) system, with an end-to-end framework using the alignment loss, the ASR loss, and the one or more LLM based sentence embeddings aligned with the one or more speech-based embeddings to produce one or more enriched embeddings.

16. The computer program product of claim 15, wherein the program instructions are further executable to cause the processor to:
determine, by the processor, a contrastive loss between the one or more LLM based sentence embeddings and the one or more speech-based embeddings.

17. The computer program product of claim 15, wherein the program instructions are further executable to cause the processor to:
use, by the processor, non-contextual embeddings as queries to align the one or more LLM based sentence embeddings with the one or more speech-based embeddings.

18. The computer program product of claim 15, wherein the program instructions are further executable to cause the processor to:
adapt, by the processor, the ASR system to perform a Spoken Language Understanding (SLU) task; and
create, by the processor, speech-based embeddings aligned with the one or more LLM based sentence embeddings, and
fusing, by the system, the speech-based embeddings with one or more ASR based embeddings.

19. The computer program product of claim 18, wherein the program instructions are further executable to cause the processor to:
create, by the processor, a speech-based summary token to approximate the one or more LLM based sentence embeddings to determine an SLU loss.

20. The computer program product of claim 19, wherein the program instructions are further executable to cause the processor to:
integrate, by the processor, the speech-based summary token along with other embeddings of an end-to-end ASR model to improve a final training loss.

* * * * *